US012574919B2

(12) United States Patent
Lei

(10) Patent No.: US 12,574,919 B2
(45) Date of Patent: Mar. 10, 2026

(54) DATA TRANSMISSION METHOD AND RELATED DEVICE

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 645 days.

(21) Appl. No.: 17/452,652

(22) Filed: Oct. 28, 2021

(65) Prior Publication Data

US 2022/0053510 A1 Feb. 17, 2022

Related U.S. Application Data

(63) Continuation of application No. PCT/CN2020/118252, filed on Sep. 28, 2020.

(30) Foreign Application Priority Data

Nov. 7, 2019 (CN) .......................... 201911084577.4

(51) Int. Cl.
| | |
|---|---|
| *H04W 72/12* | (2023.01) |
| *H04W 8/18* | (2009.01) |
| *H04W 72/121* | (2023.01) |
| *H04W 72/30* | (2023.01) |
| *H04W 4/06* | (2009.01) |

(52) U.S. Cl.
CPC ........... *H04W 72/121* (2013.01); *H04W 8/18* (2013.01); *H04W 72/30* (2023.01); *H04W 4/06* (2013.01)

(58) Field of Classification Search
CPC ..... H04W 72/30; H04W 4/08; H04W 72/121; H04W 8/18; H04W 4/029; H04W 8/186; H04W 4/021
See application file for complete search history.

(56) References Cited

U.S. PATENT DOCUMENTS

| | | | |
|---|---|---|---|
| 2016/0119395 A1 | 4/2016 | Li et al. | |
| 2021/0003412 A1* | 1/2021 | Xu ..................... | G06F 18/23213 |
| 2022/0303733 A1* | 9/2022 | Solano Arenas ....... | H04W 4/08 |

FOREIGN PATENT DOCUMENTS

| | | |
|---|---|---|
| CN | 101296412 | 10/2008 |
| CN | 102857873 | 1/2013 |
| (Continued) | | |

OTHER PUBLICATIONS

International Search Report issued Dec. 31, 2020 in PCT Application No. PCT/CN2020/118252 (with English Translation).

(Continued)

*Primary Examiner* — Anez C Ebrahim
(74) *Attorney, Agent, or Firm* — ArentFox Schiff LLP

(57) ABSTRACT

A data transmission method is provided to flexibly configure a terminal group within a target region. The method includes obtaining, by a control device, terminal group information transmitted by an application server, the terminal group information being generated by the application server according to target service data, and the target service data being service data to be transmitted within a target region, determining, by the control device, wireless coverage information and user location information, determining, by the control device, a group configuration according to the terminal group information, the determined wireless coverage information, and the user location information; and transmitting, by the control device, the target service data based on the determined group configuration. The method may flexibly configure a terminal group within a target region. Apparatus and non-transitory computer-readable storage medium counterpart embodiments are also provided.

20 Claims, 6 Drawing Sheets

(56)        References Cited

FOREIGN PATENT DOCUMENTS

| CN | 105491557 | 4/2016 |
|----|-----------|--------|
| CN | 105992155 | 10/2016 |
| CN | 107995603 | 5/2018 |
| CN | 110809244 | 2/2020 |
| WO | WO2015/000141 A1 | 1/2015 |
| WO | WO2016/054588 A1 | 4/2016 |
| WO | WO2017/113109 A1 | 7/2017 |
| WO | WO2018/006279 A1 | 1/2018 |

OTHER PUBLICATIONS

Written Opinion issued Dec. 31, 2020 in PCT Application No. PCT/CN2020/118252.

Nokia, "V2X transmission via eMBMS—broadcast area", TSG SA WG2 Meeting #114, S2-161913, Apr. 11-15, 2016, 4 pages.

Chinese Office Action issued Jan. 6, 2021 in Chinese Application No. 201911084577.4 (with Concise English Explanation of Relevance).

CATT, "Resource Efficiency for eMBMS Solution", 3GPP TSG RAN WG2 Meeting #85, R2-140142, Feb. 10-14, 2013, 5 pages.

ZTE, "Deployment of MBSFN area for Group communication", 3GPP TSG RAN WG2 #84, R2-134193, Nov. 11-15, 2013, 3 pages.

Chinese Office Action issued Aug. 2, 2021 in Chinese Application No. 201911084577.4 (with Concise English Explanation of Relevance).

Japanese Office Action mailed Mar. 7, 2023 in Application No. 2022-515665, 7 pages with English Translation.

* cited by examiner

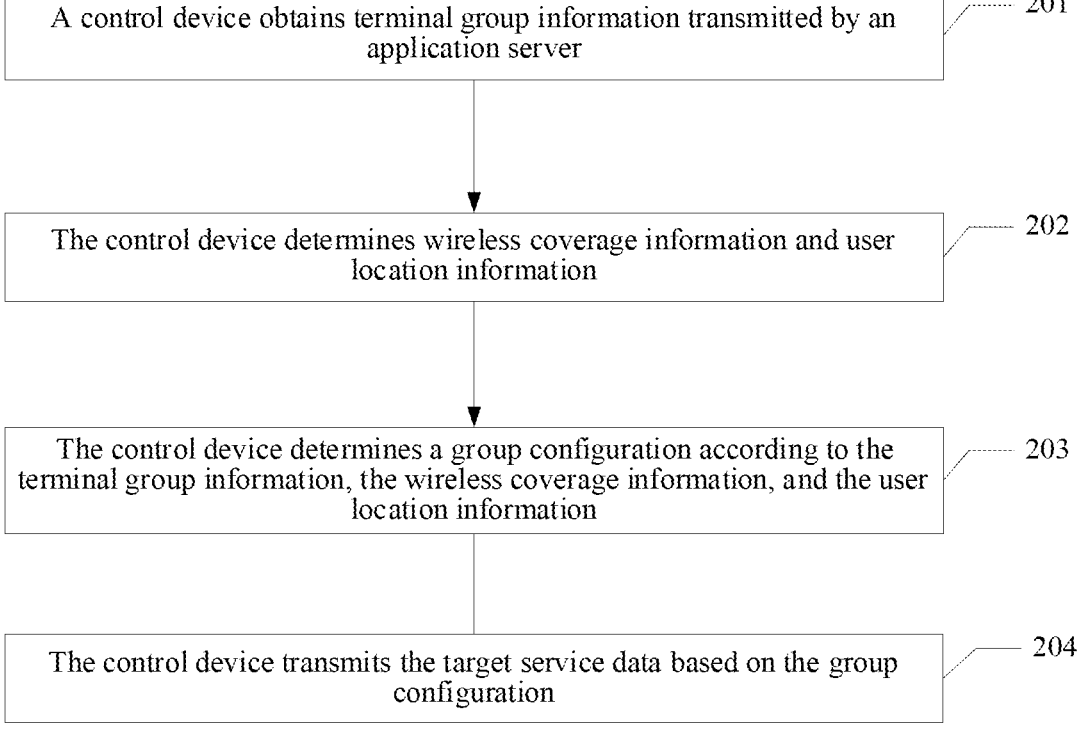

A control device obtains terminal group information transmitted by an application server ⟋⎯ 201

The control device determines wireless coverage information and user location information ⟋⎯ 202

The control device determines a group configuration according to the terminal group information, the wireless coverage information, and the user location information ⟋⎯ 203

The control device transmits the target service data based on the group configuration ⟋⎯ 204

FIG. 2

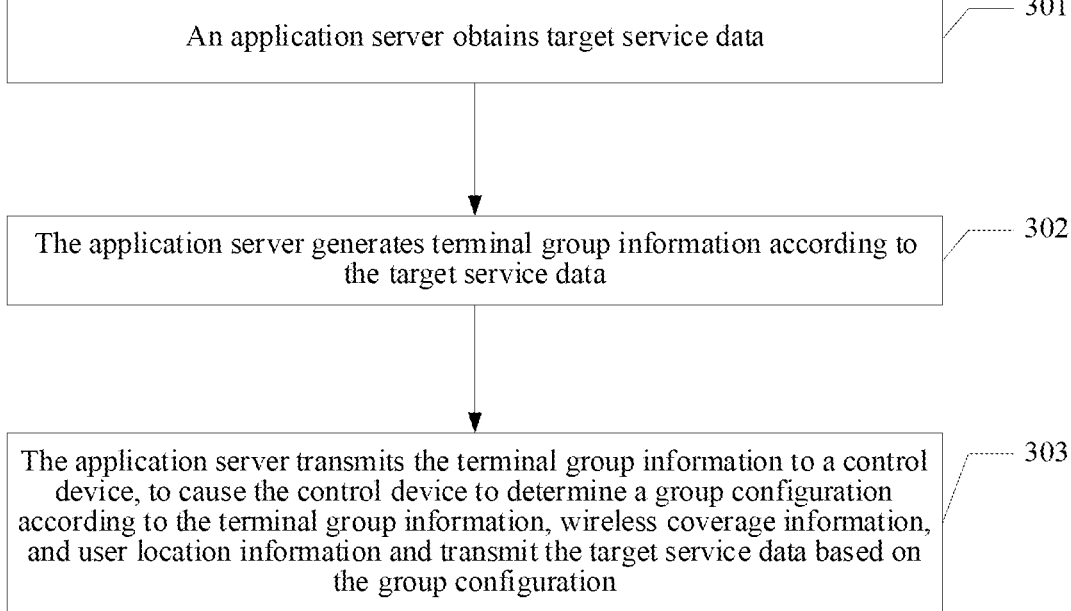

An application server obtains target service data — 301

The application server generates terminal group information according to the target service data — 302

The application server transmits the terminal group information to a control device, to cause the control device to determine a group configuration according to the terminal group information, wireless coverage information, and user location information and transmit the target service data based on the group configuration — 303

FIG. 3

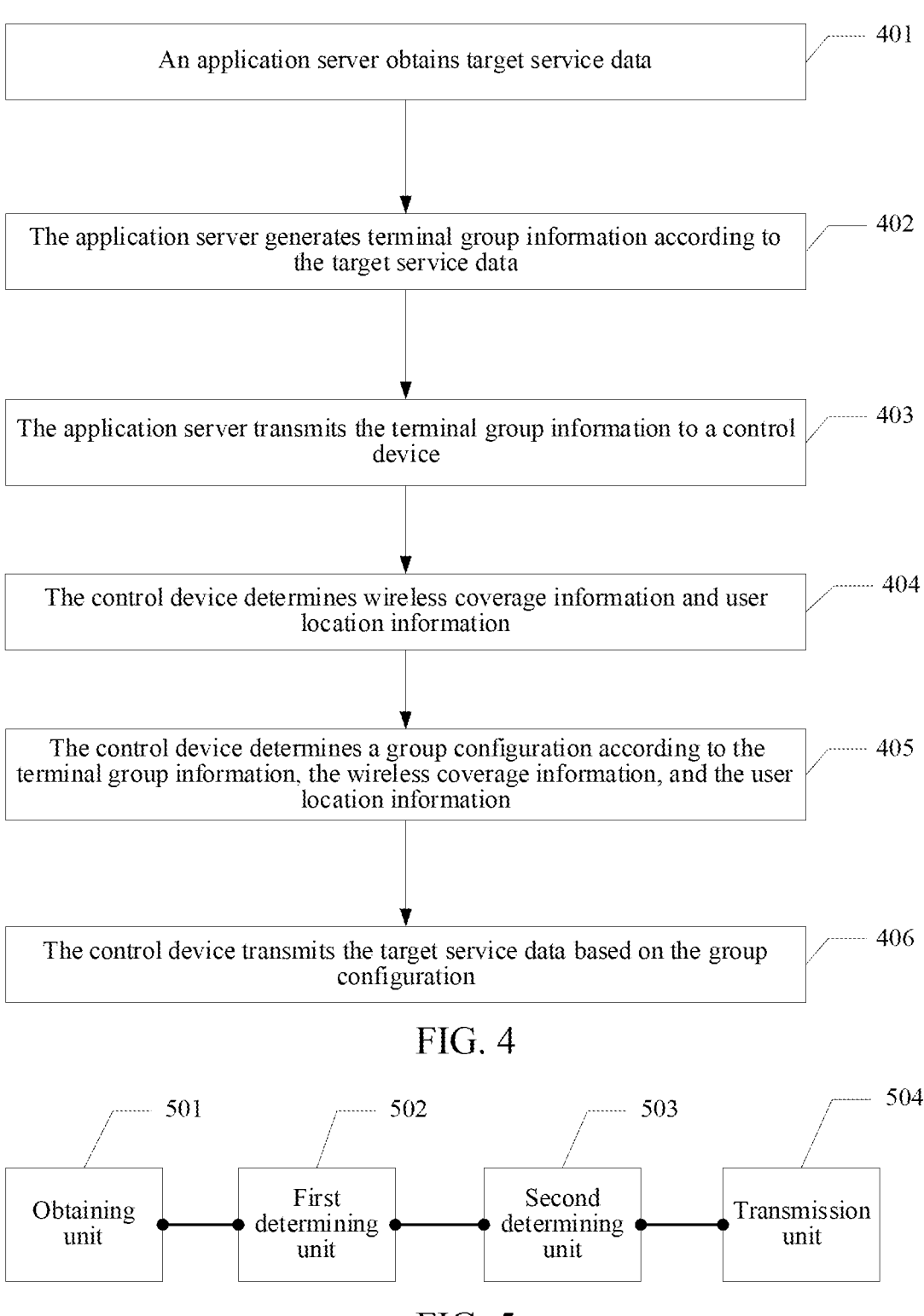

An application server obtains target service data ⟋— 401

The application server generates terminal group information according to the target service data ⟋— 402

The application server transmits the terminal group information to a control device ⟋— 403

The control device determines wireless coverage information and user location information ⟋— 404

The control device determines a group configuration according to the terminal group information, the wireless coverage information, and the user location information ⟋— 405

The control device transmits the target service data based on the group configuration ⟋— 406

FIG. 4

| Obtaining unit | First determining unit | Second determining unit | Transmission unit |
|---|---|---|---|

DATA TRANSMISSION METHOD AND RELATED DEVICE

RELATED APPLICATIONS

This application is a continuation of International Application No. PCT/CN2020/118252, entitled "DATA TRANSMISSION METHOD AND RELATED DEVICE" and filed on Sep. 28, 2020, which claims priority to Chinese Patent Application No. 201911084577.4, entitled "DATA TRANSMISSION METHOD AND RELATED DEVICE," filed on Nov. 7, 2019. The entire disclosures of the above-identified prior applications are incorporated herein by reference in their entirety.

FIELD OF THE TECHNOLOGY

This disclosure relates to the field of information processing, including a data transmission technology.

BACKGROUND OF THE DISCLOSURE

With advances in network communication technologies, a 5G network begins to be quickly developed. 5G broadcast is a technical characteristic to be introduced in the 5G network, and aims to support a broadcast service through enhancement based on New Radio (NR) and a 5G core network (5GC). Future application of the 5G broadcast technology has a broad prospect, including broadcast of a large-scale live program, transmission of common service data in Internet of Vehicles, software update pushing, a television program, and the like.

Long Term Evolution (LTE) of a 4G system supports a Multimedia Broadcast/Multicast Service (MBMS) or an Evolved Multimedia Broadcast/Multicast Service (eM-BMS).

However, a cell group configuration of the MBMS/eM-BMS of the related 4G is basically fixed, and the cell group configuration is not flexible, cannot dynamically adapt to a group requirement of an application layer, and can only support a broadcast service by configuring Multimedia Broadcast multicast service Single Frequency Network (MB SFN) resources for a plurality of cells. Due to this limitation, the MBMS/eMBMS of 4G is not commercially used in a large scale.

SUMMARY

This disclosure provides a data transmission method and a related device, to flexibly configure a terminal group within a target region.

A first aspect of embodiments of this disclosure provides a data transmission method, including: (1) obtaining, by a control device, terminal group information transmitted by an application server, the terminal group information being generated by the application server according to target service data, and the target service data being service data to be transmitted within a target region; (2) determining, by the control device, wireless coverage information and user location information; (3) determining, by the control device, a group configuration according to the terminal group information, the determined wireless coverage information, and the user location information; and (4) transmitting, by the control device, the target service data based on the determined group configuration.

In one embodiment, the determining, by the control device, a group configuration according to the terminal group information, the wireless coverage information, and the user location information includes: (1) parsing, by the control device, the terminal group information, and obtaining N terminal devices within the target region, where N is an integer greater than or equal to 1, and the N terminal devices correspond to the target service data; (2) determining, by the control device, a quantity of radio resources available within the target region according to the wireless coverage information and the user location information; and (3) determining, by the control device, the group configuration based on at least one of the N terminal devices, the determined quantity of radio resources available within the target region, and characteristics of the target service data.

In one embodiment, the transmitting, by the control device, the target service data based on the group configuration includes: (1) dynamically setting, by the control device, a transmission mechanism based on the group configuration, where the transmission mechanism includes one or more of unicast and multicast; and (2) transmitting, by the control device, the target service data according to the transmission mechanism.

In one embodiment, the terminal group information includes one or more of a group identifier, an identifier of a terminal device within a group, a communication resource appeal within the group, and a quality of service (QoS).

A second aspect of the embodiments of this disclosure provides a data transmission method, including: (1) obtaining, by an application server, target service data, the target service data being service data to be transmitted within a target region; (2) generating, by the application server, terminal group information according to the obtained target service data; and (3) transmitting, by the application server, the generated terminal group information to a control device, to cause the control device to determine a group configuration according to the generated terminal group information, wireless coverage information, and user location information, and transmit the target service data based on the group configuration, the wireless coverage information, and the user location information being determined by the control device.

In one embodiment, the generating, by the application server, terminal group information according to the target service data includes at least one of: determining, by the application server, a service request corresponding to a terminal device within the target region, and generating the terminal group information according to the service request and the target service data; determining, by the application server, subscription information corresponding to the terminal device within the target region, and generating the terminal group information according to the subscription information and the target service data; and analyzing, by the application server, a user profile and a user behavior that correspond to the terminal device within the target region, obtaining an analysis result, and generating the terminal group information according to the analysis result and the target service data.

In one embodiment, the terminal group information includes at least one of a group identifier, an identifier of a terminal device within a group, a communication resource appeal within the group, and a quality of service (QoS).

A third aspect of the embodiments of this disclosure provides a data transmission apparatus, including: circuitry configured to (1) obtain terminal group information transmitted by an application server, the terminal group information being generated by the application server according to target service data, and the target service data being service data to be transmitted within a target region; (2) determine wireless coverage information and user location information;

(3) determine a group configuration according to the terminal group information, the determined wireless coverage information, and the user location information; and (4) transmit the target service data based on the determined group configuration.

In one embodiment, the circuitry is specifically configured to: (1) parse the terminal group information, and obtaining N terminal devices within the target region, where N is an integer greater than or equal to 1, and the N terminal devices correspond to the target service data; (2) determine a quantity of radio resources available within the target region according to the wireless coverage information and the user location information; and (3) determine the group configuration based on at least one of the N terminal devices, the determined quantity of radio resources available within the target region, and characteristics of the target service data.

In one embodiment, the transmission unit is specifically configured to: (1) dynamically set a transmission mechanism based on the group configuration, where the transmission mechanism includes one or more of unicast and multicast; and (2) transmit the target service data according to the transmission mechanism.

In one embodiment, the terminal group information includes at least one of a group identifier, an identifier of a terminal device within a group, a communication resource appeal within the group, and a quality of service (QoS).

A fourth aspect of the embodiments of this disclosure provides a data transmission apparatus, including circuitry configured to (1) obtain target service data, the target service data being service data to be transmitted within a target region; (2) generate terminal group information according to the obtained target service data; and (3) transmit the generated terminal group information to a control device, to cause the control device to determine a group configuration according to the generated terminal group information, wireless coverage information, and user location information, and transmit the target service data based on the group configuration, the wireless coverage information, and the user location information being determined by the control device.

In one embodiment, the circuitry is specifically configured to at least one of: (1)

determine, by the application server, a service request corresponding to a terminal device within the target region, and generating the terminal group information according to the service request and the target service data; (2) determine, by the application server, subscription information corresponding to the terminal device within the target region, and generating the terminal group information according to the subscription information and the target service data; and (3) analyze, by the application server, a user profile and a user behavior that correspond to the terminal device within the target region, obtaining an analysis result, and generating the terminal group information according to the analysis result and the target service data.

In one embodiment, the terminal group information includes at least one of a group identifier, an identifier of a terminal device within a group, a communication resource appeal within the group, and a quality of service (QoS).

A fifth aspect of the embodiments of this disclosure provides a computer apparatus, including processing circuitry, memory, and a transceiver that are connected, the memory being configured to store program code, and the processing circuitry being configured to invoke the program code in the memory to perform operations of the data transmission method according to the foregoing aspects.

A sixth aspect of the embodiments of this disclosure provides a non-transitory computer storage medium, including instructions, the instructions, when executed by a computer, cause the computer to perform the data transmission method according to the foregoing aspects.

A seventh aspect of the embodiments of this disclosure provides a control device, including processing circuitry and a memory, the memory being configured to store program code and transmit the program code to the processor; and the processing circuitry being configured to perform the data transmission method according to the first aspect of the embodiments of this application according to instructions in the program code.

An eighth aspect of the embodiments of this disclosure provides an application server, including processing circuitry and a memory, the memory being configured to store program code and transmit the program code to the processor; and the processing circuitry being configured to perform the data transmission method according to the second aspect of the embodiments of this application according to instructions in the program code.

A ninth aspect of the embodiments of this disclosure provides a non-transitory computer-readable storage medium storing instructions, the instructions, when executed by a computer, cause the computer to perform the data transmission method according to the foregoing aspects.

In summary, it can be seen that, in the embodiments of this disclosure, the control device may obtain the terminal group information transmitted by the application server, and determine the group configuration according to the terminal group information, the wireless coverage information and the user location information, and finally the control device transmits the target service data based on the group configuration. In this way, regardless of how terminal devices within the target region change, the terminal group may be dynamically configured in real time according to the terminal group information, the wireless coverage information and the user location information. Compared with the fixed cell group configuration in the related art, a configuration manner provided in the embodiments of this disclosure is more flexible.

BRIEF DESCRIPTION OF THE DRAWINGS

FIG. 2 is a schematic flowchart of a data transmission method according to an embodiment of this disclosure.

FIG. 3 is another schematic flowchart of a data transmission method according to an embodiment of this disclosure.

FIG. 4 is another schematic flowchart of a data transmission method according to an embodiment of this disclosure.

FIG. 5 is a schematic virtual structural diagram of a data transmission apparatus according to an embodiment of this disclosure.

DESCRIPTION OF EMBODIMENTS

Figure 1:
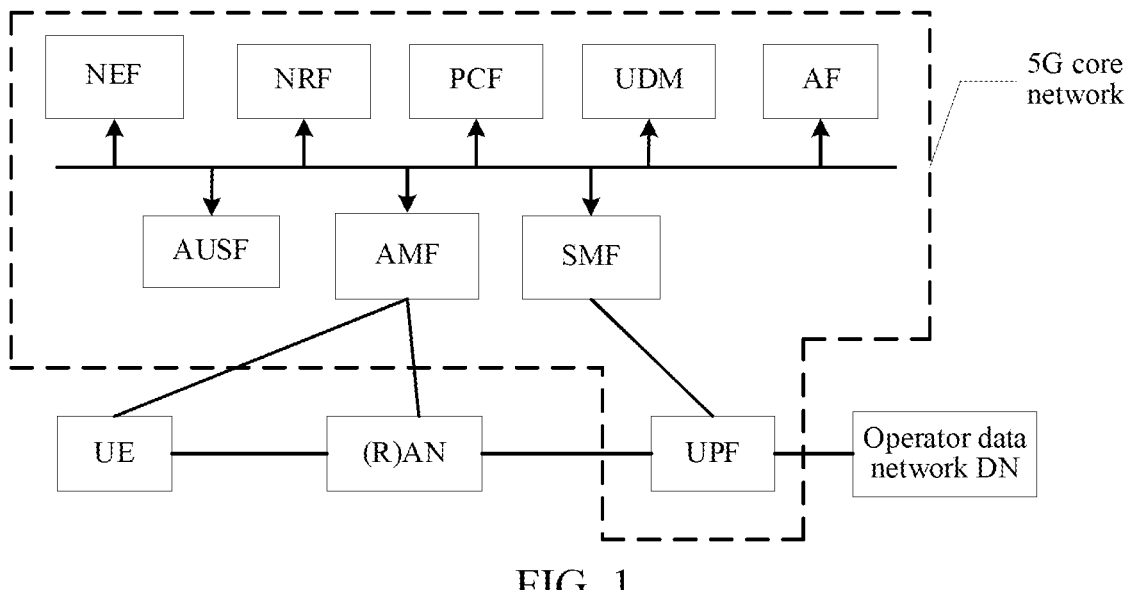
FIG. 1 is a schematic diagram of a network architecture of a data transmission method according to an embodiment of this disclosure.

The technical solutions in embodiments of this disclosure are clearly described in the following with reference to the accompanying drawings in the embodiments of this disclosure. The described embodiments are merely some rather than all of the embodiments of this disclosure.

In the specification, claims, and accompanying drawings of this disclosure, the terms "first," "second," and so on are intended to distinguish between similar objects but do not necessarily indicate a specific order or sequence. It is to be understood that the data used in such a way is interchangeable in proper cases, so that the embodiments described herein can be implemented in other orders than the order illustrated or described herein. Moreover, the terms "include," "contain," and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Division of the modules in this disclosure is merely logical division and there may be other division manners during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or other forms, which is not limited in this disclosure. Moreover, modules or sub-modules described as separate components may or may not be physically separated, may or may not be physical modules, or may be distributed in a plurality of circuit modules. Some of or all of the modules may be selected according to actual needs to achieve the objectives of the solutions of this disclosure.

For ease of understanding, terms involved in this disclosure are described first.

A Multimedia Broadcast/Multicast Service (MBMS) is introduced by the 3rd Generation Partnership Project (3GPP) to effectively use resources of a mobile communication network, and provides a point-to-multipoint service in which a data source sends data to a plurality of users in the mobile communication network, to implement network resource sharing, and improve resource utilization, and in particular, air interface resources. The MBMS service can implement plain-text and low-rate message multicast and broadcast, and can further implement multicast and broadcast of a high-rate multimedia service. Compared with other data services, because the MBMS service has an uplink channel, the MBMS service may provide more interaction without causing a sharp decrease in network performance.

An Evolved Multimedia Broadcast/Multicast Service (eMBMS) can establish point-to-multipoint wireless transmission under the premise that a wireless network (700M) does not occupy additional frequency spectrum resources. All users watching the same content share the same air interface resource, and a bearer network also only needs to transmit the same data. Between a service system and a user terminal, a plurality of users share the same bandwidth resource, greatly saving wireless air interface and network transmission resources, and improving overall network efficiency.

A Multimedia Broadcast multicast service Single Frequency Network (MBSFN) uses simultaneous transmission of the same waveform from a plurality of cells. In this way, user equipment (UE) can consider a plurality of MBSFN cells as a large cell. Moreover, the UE will be not subject to transmission interference between neighboring cells, and will benefit from superposition of signals from the plurality of MB SFN cells.

However, a cell group configuration corresponding to the related MBMS/eMBMS is basically fixed, and the cell group configuration is not flexible, and cannot dynamically adapt to group requirements of an application layer.

In view of this, this disclosure provides a data transmission method. During service data transmission, an application server generates terminal group information according to service data corresponding to a target region. Then the application server transmits the terminal group information to a control device. The control device determines a group configuration according to the terminal group information, wireless coverage information, and user location information, and then transmits the service data based on the group configuration. Regardless of increase or decrease in terminal devices within the target region, the corresponding terminal group information may be determined, and the corresponding group configuration is generated based on the terminal group information. In this way, compared with a fixed configuration of a terminal group in a cell in the related art, the terminal group may be configured more flexibly.

The data transmission method may be applied to various communication networks. For example, the data transmission method may be applied to a 5G communication network, and may be further applied to a future communication network such as a 6G network or a 7G network. A name of any network element or entity involved in this disclosure is not limited, and may be replaced with a name of a network element or entity that has the same or similar function in the future communication network, which is not specifically limited.

A 5G core network is taken herein as an example to describe the data transmission method of this disclosure. FIG. 1 is a diagram of a network architecture of the 5G core network provided in an embodiment of this disclosure. The 5G core network includes: a network exposure function (NEF) entity, a network repository function (NRF) entity, a policy control function (PCF) entity, a unified data management (UDM) network element, an application function (AF) entity, an authentication server function (AUSF) network element, an access and mobility management function (AMF) entity, a session management function (S1VIF) entity, and a user plane function (UPF) entity, and a quantity of each type of network elements, entities, or devices may be one or more.

The NEF entity is configured to connect other internal network elements of the core network to an external application server of the core network; and provide, when the external application server initiates a service request to the core network, services such as authentication and data forwarding, so as to provide network capability information to the external application server, or provide information of the external application server to a network element of the core network. In an implementation of this disclosure, when the AF entity transmits data with a network element of the core network, an access network device, or the like, for example, the PCF entity, the NEF entity may forward the data.

The NRF entity supports a service discovery function, that is, the NRF entity receives NF-Discovery-Request transmitted by the network element, then provides network element information discovered by the NRF entity to a requester, and maintains features of available network element examples and a service capability that the NRF entity supports.

The PCF entity mainly supports providing a unified policy framework to control a network behavior and providing policy rules to a network function of a control layer, and moreover is responsible for obtaining user subscription information related to a policy decision.

The UDM network element has main functions as follows: (1) generation of a 3GPP authentication certificate/ authentication parameter; (2) storage and management of a permanent identity document (ID) of a 5G system; (3) subscription information management; (4) MT-SMS submission; (5) SMS management; and (6) registration management of a service network element (such as the AMF entity or the SMF entity that currently provides a service to a terminal) of a user.

The AF entity is specifically an application server corresponding to an application, has an application service function, and interacts with a network element of the core network to provide services to a terminal device. For example, the AF entity interacts with the PCF entity to perform service policy control, or interacts with the NEF entity to obtain network capability information or provide application information to a network, or interacts with the PCF entity to provide data network (DN) access point information to the PCF entity, so that the PCF entity generates routing information of a corresponding data service.

The AUSF network element supports authentication of 3GPP access and authentication of untrusted non-3GPP access.

The AMF entity is mainly responsible for authentication of the terminal device, mobility management of the terminal device, network slice selection, selection of the SMF entity, and other functions.

The SMF entity is mainly responsible for control plane functions of UE session management, including UPF selection, IP address assignment, QoS management of a session, obtaining a policy control and charging policy (from the PCF entity), and the like.

The UPF entity is mainly responsible for routing and forwarding of a data packet, and flow mapping of quality of service (QoS).

The RAN may be a network formed by a plurality of RAN devices, and implements a wireless physical layer function, resource scheduling and radio resource management, a radio access control and mobility management function, and the like. A RAN device is connected to the UPF entity through a user plane interface N3, and is configured to transmit data of the terminal device. The RAN device establishes a control plane signaling connection to the AMF entity through a control plane interface N2, and is configured to implement radio access bearer control and other functions. FIG. 1 of this disclosure shows a radio access network device, that is, RAN device, and may alternatively be replaced with a wired access network device.

The UE is configured to provide voice/data connectivity to users, and is, for example, a handheld device or an in-vehicle device that has a wireless connection function.

The UE may alternatively be a smart mobile phone, a mobile station (MS), a mobile terminal (MT), or the like. The UE may also be referred to as a terminal device below.

The following describes the data transmission method provided in this disclosure based on the foregoing network architecture in FIG. 1.

FIG. 2 is a schematic flowchart of a data transmission method according to an embodiment of this application. The method includes the following steps.

In step 201, a control device obtains terminal group information transmitted by an application server.

In this embodiment, the control device may obtain the terminal group information transmitted by the application server, the terminal group information being generated by the application server according to target service data obtained by the application server, and the target service data being service data to be transmitted within a target region. The terminal group information includes, but is not limited to, a group identifier, an identifier of a terminal device within a group, a communication resource appeal within the group, and QoS.

The control device may be an access network device in a 5G network, or may be a device in another network, such as a device that has the same or similar function in 6G or 7G, which is not specifically limited. 5G is taken herein as an example for description. The control device includes, but is not limited to, a PCF entity, a broadcast function (BMF) entity, and another network function (NF) entity. When the control device includes the PCF entity, the application server may directly transmit the terminal group information to the PCF entity, or may forward the terminal group information through the NEF entity to the PCF entity; when the control device includes the BMF entity, the application server may directly transmit the terminal group information to the BMF entity, or may forward the terminal group information through the PCF entity to the BMF entity, which is not specifically limited.

The BMF entity is a new entity provided in the embodiments of this disclosure, which may be an individual function entity, or may be integrated into another network function (NF) entity. The BMF entity may implement a configuration of a cell group within a target region, and configure corresponding signaling and data connections for users to perform broadcast mechanism communication from a control plane or a user plane.

In step 202, the control device determines wireless coverage information and user location information.

In this embodiment, after receiving the terminal group information, the control device may further trigger determining the wireless coverage information and the user location information.

The wireless coverage information refers to information about channel quality or congestion of a terminal device that may normally receive and transmit signals and perform wireless communication (such as Internet access, making a call, WeChat and the like) within wireless coverage of the control device.

The user location information may include longitude, latitude, altitude, and other information of a location of the UE, and may be obtained by the application server and sent to the control device, or may be obtained by the control device. The user location information may be represented through the longitude, latitude, and altitude, or may be represented in other ways, such as coordinates. Additionally, without longitude and latitude information, the user location information may alternatively be obtained based on a serving cell, sector, or radio resource management (RRM) measurement mechanism, which is not specifically limited.

In step 203, the control device determines a group configuration according to the terminal group information, the wireless coverage information, and the user location information.

In this embodiment, after the control device obtains the terminal group information, and determines the wireless coverage information and the user location information, the control device may determine the group configuration according to the terminal group information, the wireless coverage information, and the user location information. Specific descriptions are provided below.

The control device determining a group configuration according to the terminal group information, the wireless coverage information, and the user location information includes:

(1) the control device parses the terminal group information, and obtains N terminal devices within the target region, where N is an integer greater than or equal to 1, and the N terminal devices correspond to the target service data; (2) the control device determines a quantity of radio resources available within the target region according to the wireless coverage information and the user location information; and (3) the control device determines the group configuration based on at least one of the N terminal devices, the quantity of radio resources available within the target region, and characteristics of the target service data.

That is to say, the control device may first parse the terminal group information, and obtain N terminal devices within the target region (the N terminal devices have an association relationship with the target service data, that is to say, each terminal device in the N terminal devices subscribes to a service request associated with the target service data, and/or subscribes to a subscription server associated with the target service data, and/or obtains an analysis result associated with the target service data by analyzing a user profile and a user behavior corresponding to each terminal device), where, the target region is a transmission region of the target service data (that is, the target service data needs to be transmitted within the target region).

Secondly, the quantity of radio resources available within the target region is determined according to the wireless coverage information and the user location information, that is, the control device may determine the quantity of radio resources available within the target region according to channel quality and congestion of the terminal device within the coverage and longitude, latitude, altitude, and other position information of the terminal device within the coverage.

Finally, the group configuration is determined based on N terminal devices, the quantity of radio resources available within the target region and/or characteristics of the target service data (the characteristics of the target service data refer to whether the target service data is data that is compulsorily transmitted, for example, for a landslide region, information about landslide attention on a road section ahead may be compulsorily sent to all terminal devices passing through the region, reminding users of the terminal devices of protection; and certainly there may also be other types, and the above is only an exemplary description, and does not represent a limitation on the target service data), that is, when transmitting the target service data, the control device needs to transmit the target service data through the radio resource to the terminal device. That is to say, only one of the factors may be considered. For example, the target service data may be transmitted to all terminal devices associated with the target service data within the target region, or a plurality of factors may be considered comprehensively, which is not specifically limited. Additionally, when there is a requirement for data transmission QoS, the data transmission QoS further needs to be considered. For example, radio resources with high quality of service are selected for transmission. Exemplary descriptions are provided below.

Assuming that the target region is a region centered on a square and having a radius of one kilometer, within this region, a quantity of terminal devices that need a certain service reaches a preset value, such as 500. Additionally, the quantity of radio resources available within the region and whether a characteristic of the service is to configure a cell group for the region further need to be considered. If the quantity of user terminals that need a certain service within this region reaches a preset value, the quantity of available radio resources is sufficient, and the characteristic of the service is to allow establishment, a group will be configured for the target region, and the group is broadcast directly in a downlink direction to a user terminal that needs this service; otherwise, no group is configured for the target region.

In step 204, the control device transmits the target service data based on the group configuration.

In this embodiment, after determining the corresponding group configuration within the target region, the control device may transmit the target service data based on the group configuration, that is, the control device may determine a terminal device corresponding to the target service data, and then transmit the target service data to the corresponding terminal device. Specifically, the control device may dynamically set a transmission mechanism based on the group configuration, where the transmission mechanism includes one or more of unicast and multicast, and transmits the target service data according to the transmission mechanism, that is to say, after completing the group configuration, the control device may determine the terminal device corresponding to the target service data, and a radio resource through which the target service data is transmitted. In this case, the transmission mechanism may be selected according to a quantity of terminal devices that need the target service data within the target region and/or a quantity of radio resources available within the target region, for example, when the quantity of terminal devices that need the target service data within the target region reaches a preset value, and/or the quantity of radio resources available within the target region reaches another preset value, the transmission is performed in a multicast manner. The description herein is only an example. As long as the target service data may be transmitted normally, the transmission manner is not specifically limited.

In a process of data transmission, the transmission mechanism may be further switched, for example, from unicast to multicast, or from multicast to unicast. To ensure continuous service data transmission, a connect-before-break manner or a redundancy transmission mechanism within a specific time window may be used. For example, before switching from multicast to unicast, a unicast link is first established or configured, and then switching from multicast to unicast is performed. A receiving end differentiates between repeated packets according to a packet sequence number corresponding to the target service data or other manners, to implement normal communication.

In an embodiment, before transmission of target data, whether to transmit the target service data in a unicast or multicast manner is determined through interaction with an application server. The transmission mechanism may certainly be determined through other methods, which is not specifically limited.

To sum up, it can be seen that, in the embodiments of this disclosure, the control device may obtain the terminal group information transmitted by the application server, and determine the group configuration according to the terminal group information, the wireless coverage information and the user location information, and finally the control device transmits the target service data based on the group configuration. In this way, regardless of how terminal devices within the target region change, the terminal group may be dynamically configured in real time according to the terminal group information, the wireless coverage information and the user location information. Compared with the fixed cell group configuration manner in the related art, the configuration manner of the embodiments of this application is more flexible.

The data transmission method provided in this disclosure will be described below from the perspective of an application server with reference to FIG. 3.

FIG. 3 is another schematic flowchart of a data transmission method according to an embodiment of this disclosure. The method includes the following steps.

In step 301, the application server obtains target service data.

In this embodiment, the application server may first obtain the target service data, where the target service data is service data to be transmitted within a target region. A manner in which the application server obtains the target service data is not specifically limited herein.

In step 302, the application server generates terminal group information according to the target service data.

In this embodiment, after obtaining the target service data, the application server may generate the terminal group information according to the target service data, where the terminal group information includes, but is not limited to, a group identifier, an identifier of a terminal device within a group, a communication resource appeal within the group, and quality of service (QoS). The detailed descriptions are as follows.

The application server generating the terminal group information according to the target service data includes at least one of: (1) the application server determines a service request corresponding to the terminal device within the target region, and generates the terminal group information according to the service request and the target service data; (2) the application server determines subscription information corresponding to the terminal device within the target region, and generates the terminal group information according to the subscription information and the target service data; and (3) the application server analyzes a user profile and a user behavior that correspond to the terminal device within the target region, obtains an analysis result, and generates the terminal group information according to the analysis result and the target service data.

That is to say, the application server may generate the terminal group information through three different methods as follows.

1. Determine the service request corresponding to the terminal device within the target region, and generate the terminal group information according to the service request and the target service data.

First, the application server may determine the service request corresponding to the terminal device within the target region, then determine an identifier of the terminal device associated with the target service data based on the service request corresponding to the terminal device and the target service data, and generate the terminal group information with reference to a group identifier, a communication resource appeal within the group and QoS.

2. Determine subscription information corresponding to the terminal device within the target region, and generate the terminal group information according to the subscription information and the target service data.

First, the application server may determine the subscription information corresponding to the terminal device (such as services that each terminal device subscribes to, for example, a weather broadcast service), then determine an identifier of the terminal device associated with the target service data based on the subscription information corresponding to the terminal device and the target service data, and generate the terminal group information with reference to the group identifier, the communication resource appeal within the group and QoS.

3. Analyze a user profile and a user behavior that correspond to the terminal device within the target region, obtain an analysis result, and generate the terminal group information according to the analysis result and the target service data.

First, the application server obtains a user profile and/or a user behavior that correspond to the terminal device within the target region, analyzes the user profile and/or the user behavior, obtains an analysis result, where the analysis result may indicate whether the terminal device is associated with the target service data, then obtains an identifier of the terminal device associated with the target service data within the target region according to the analysis result, and generates the terminal group information with reference to the group identifier, the communication resource appeal within the group and QoS.

In the foregoing three methods, the terminal group information may be respectively generated through the service request, the subscription information, and the user profile and the user behavior individually, or certainly a combination of any two thereof. For example, when the terminal group information is generated, the service request corresponding to the terminal device within the target region and the subscription information are comprehensively considered. Alternatively, the terminal group information may be generated through a combination of three thereof. For example, when the terminal group information is generated, the service request, the subscription information, and the user profile and the user behavior corresponding to the terminal device within the target region are comprehensively considered, which is not specifically limited.

In step 303, the application server transmits the terminal group information to a control device, to cause the control device to determine a group configuration according to the terminal group information, wireless coverage information, and user location information and transmit the target service data based on the group configuration.

In this embodiment, the application server may transmit the terminal group information to the control device, to cause the control device to determine the group configuration according to the terminal group information, wireless coverage information, and user location information, and transmit the target service data based on the group configuration, the wireless coverage information and the user location information being determined by the control device. Operations performed after the control device obtains the terminal group information have been described in detail in FIG. 2 above, and details are not described herein again.

In summary, it can be seen that, in the embodiments of this disclosure, the application server may generate the terminal group information according to the target service data, and transmit the terminal group information to the control device, the control device determines the group configuration according to the terminal group information, the wireless coverage information and the user location information, and finally the control device transmits the target service data based on the group configuration. In this way, regardless of increase or decrease in the terminal devices within the target region, the application server may generate the corresponding terminal group information in real time, and transmit the terminal group information to the control device. The terminal group within the target region may be dynamically configured according to the terminal group information, the wireless coverage information and the user location information by the control device. Compared with the fixed cell group configuration manner in the related art, the configuration manner is more flexible.

The data transmission methods in this disclosure are described above from the perspective of the control device and the perspective of the application server respectively, and the data transmission method in this disclosure is described below with reference to FIG. 4 from the perspective of interaction between the control device and the application server.

FIG. 4 is another schematic flowchart of a data transmission method according to an embodiment of this disclosure. The method includes the following steps.

In step 401, the application server obtains target service data.

In this embodiment, the application server may first obtain the target service data, where the target service data is service data to be transmitted within a target region. A manner in which the application server obtains the target service data is not specifically limited herein.

In step 402, the application server generates terminal group information according to the target service data.

In this embodiment, after obtaining the target service data, the application server may generate the terminal group information according to the target service data, where the terminal group information includes, but is not limited to, a group identifier, an identifier of a terminal device within a group, a communication resource appeal within the group, and quality of service (QoS). The detailed descriptions are as follows.

The application server generating the terminal group information according to the target service data includes at least one of (1) the application server determines a service request corresponding to the terminal device within the target region, and generates the terminal group information according to the service request and the target service data; (2) the application server determines subscription information corresponding to the terminal device within the target region, and generates the terminal group information according to the subscription information and the target service data; and (3) the application server analyzes a user profile and a user behavior that correspond to the terminal device within the target region, obtains an analysis result, and generates the terminal group information according to the analysis result and the target service data.

That is to say, the application server may generate the terminal group information through three different methods:

1. Determine the service request corresponding to the terminal device within the target region, and generate the terminal group information according to the service request and the target service data.

First, the application server may determine the service request corresponding to the terminal device within the target region, then determine an identifier of the terminal device associated with the target service data based on the service request corresponding to the terminal device and the target service data, and generate the terminal group information with reference to a group identifier, a communication resource appeal within the group and QoS.

2. Determine subscription information corresponding to the terminal device within the target region, and generate the terminal group information according to the subscription information and the target service data.

First, the application server may determine the subscription information corresponding to the terminal device (such as services that each terminal device subscribes to, for example, a weather broadcast service), then determine an identifier of the terminal device associated with the target service data based on the subscription information corresponding to the terminal device and the target service data, and generate the terminal group information with reference to the group identifier, the communication resource appeal within the group and QoS.

3. Analyze a user profile and a user behavior that correspond to the terminal device within the target region, obtain an analysis result, and generate the terminal group information according to the analysis result and the target service data.

First, the application server obtains a user profile and/or a user behavior that correspond to the terminal device within the target region, analyzes the user profile and/or the user behavior, obtains an analysis result, where the analysis result may indicate whether the terminal device is associated with the target service data, obtains an identifier of the terminal device associated with the target service data within the target region according to the analysis result, and generates the terminal group information with reference to the group identifier, the communication resource appeal within the group and QoS.

In the foregoing three methods, the terminal group information is respectively generated through the service request, the subscription information, and the user profile and the user behavior individually, or certainly a combination of any two thereof. For example, when the terminal group information is generated, the service request corresponding to the terminal device within the target region and the subscription information are comprehensively considered. Alternatively, the terminal group information may be generated through a combination of three thereof. For example, when the terminal group information is generated, the service request, the subscription information, and the user profile and the user behavior corresponding to the terminal device within the target region are comprehensively considered, which is not specifically limited.

In step 403, the application server transmits the terminal group information to the control device.

In step 404, the control device determines wireless coverage information and user location information.

In this embodiment, after receiving the terminal group information, the control device may further trigger determining the wireless coverage information and the user location information.

The wireless coverage information refers to information about channel quality or congestion of a terminal device that may normally receive and transmit signals and perform wireless communication (such as Internet access, making a call, WeChat and the like) within wireless coverage of the control device.

The user location information may include longitude, latitude, altitude, and other information of a location of the UE, and may be obtained by the application server and sent to the control device, or may be obtained by the control device. The user location information may be represented through the longitude, latitude, and altitude, or may be represented in other ways, such as coordinates. Additionally, without longitude and latitude information, the user location information may alternatively be obtained based on a serving cell, sector or radio resource management (RRM) measurement mechanism, which is not specifically limited.

In step 405, the control device determines a group configuration according to the terminal group information, the wireless coverage information, and the user location information.

In this embodiment, after the control device obtains the terminal group information, and determines the wireless coverage information and the user location information, the control device may determine the group configuration according to the terminal group information, the wireless coverage information, and the user location information. Specific descriptions are provided below.

The control device determining a group configuration according to the terminal group information, the wireless coverage information, and the user location information includes: (1) the control device parses the terminal group information, and obtains N terminal devices within the target region, where N is an integer greater than or equal to 1, and the N terminal devices correspond to the target service data; (2) the control device determines a quantity of radio resources available within the target region according to the wireless coverage information and the user location information; and (3) the control device determines the group configuration based on the N terminal devices, the quantity of radio resources available within the target region, and/or characteristics of the target service data.

That is to say, the control device may first parse the terminal group information, and obtain N terminal devices within the target region (the N terminal devices have an association relationship with the target service data, that is to say, each terminal device in the N terminal devices subscribes to a service request associated with the target service data, and/or subscribes to a subscription server associated with the target service data, and/or obtains an analysis result associated with the target service data by analyzing a user profile and a user behavior corresponding to each terminal device), where, the target region is a transmission region of the target service data (that is, the target service data needs to be transmitted within the target region).

Secondly, the quantity of radio resources available within the target region is determined according to the wireless coverage information and the user location information, that is, the control device may determine the quantity of radio resources available within the target region according to channel quality and congestion of the terminal device within the coverage and longitude, latitude, altitude, and other position information of the terminal device within the coverage.

Finally, the group configuration is determined based on N terminal devices, the quantity of radio resources available within the target region and/or characteristics of the target service data (the characteristics of the target service data refer to whether the target service data is data that is compulsorily transmitted, for example, for a landslide region, information about landslide attention on a road section ahead may be compulsorily sent to all terminal devices passing through the region, reminding users of the terminal devices of protection; and certainly there may also be other types, and the above is only an exemplary description, and does not represent a limitation on the target service data), that is, when transmitting the target service data, the control device needs to transmit the target service data through the radio resource to the terminal device. That is to say, in one embodiment, only one of the factors may be considered. For example, the target service data may be transmitted to all terminal devices associated with the target service data within the target region, or a plurality of factors may be considered comprehensively, which is not specifically limited. Additionally, when there is a requirement for data transmission QoS, the data transmission QoS further needs to be considered. For example, radio resources with high quality of service are selected for transmission. Exemplary descriptions are provided below.

Assuming that the target region is a region centered on a square and having a radius of one kilometer, within this region, a quantity of terminal devices that need a certain service reaches a preset value, such as 500. Additionally, the quantity of radio resources available within the region and whether a characteristic of the service is to configure a cell group for the region further need to be considered. If the quantity of user terminals that need a certain service within this region reaches a preset value, the quantity of available radio resources is sufficient, and the characteristic of the service is to allow establishment, a group will be configured for the target region, and the group is broadcast directly in a downlink direction to a user terminal that needs this service; otherwise, no group is configured for the target region.

In step 406, the control device transmits the target service data based on the group configuration.

In this embodiment, after determining the corresponding group configuration within the target region, the control device may transmit the target service data based on the group configuration, that is, the control device may determine a terminal device corresponding to the target service data, and then transmit the target service data to the corresponding terminal device. Specifically, the control device may dynamically set a transmission mechanism based on the group configuration, where the transmission mechanism includes one or more of unicast and multicast, and transmits the target service data according to the transmission mechanism, that is to say, after completing the group configuration, the control device may determine the terminal device corresponding to the target service data, and a radio resource through which the target service data is transmitted. In this case, the transmission mechanism may be selected according to a quantity of terminal devices that need the target service data within the target region and/or a quantity of radio resources available within the target region, for example, when the quantity of terminal devices that need the target service data within the target region reaches a preset value, and/or the quantity of radio resources available within the target region reaches another preset value, the transmission is performed in a multicast manner. The description herein is only an example. As long as the target service data may be transmitted normally, the transmission manner is not specifically limited.

In a process of data transmission, the transmission mechanism may be further switched, for example, from unicast to multicast, or from multicast to unicast. To ensure continuous service data transmission, a connect-before-break manner or a redundancy transmission mechanism within a specific time window may be used. For example, before switching from multicast to unicast, a unicast link is first established or configured, and then switching from multicast to unicast is performed. A receiving end differentiates between repeated packets according to a packet sequence number corresponding to the target service data or other manners, to implement normal communication.

In an embodiment, before transmission of target data, whether to transmit the target service data in a unicast or multicast manner is determined through interaction with an application server. The transmission mechanism may certainly be determined using other methods, which is not specifically limited.

In summary, it can be seen that, in the embodiments of this disclosure, the application server may generate the terminal group information according to the target service data, and transmit the terminal group information to the control device, the control device determines the group configuration according to the terminal group information, the wireless coverage information and the user location information, and finally the control device transmits the target service data based on the group configuration. In this way, regardless of how terminal devices within the target region change, the application server may generate the corresponding terminal group information in real time, and transmit the terminal group information to the control device. The terminal group within the target region may be dynamically configured according to the terminal group information, the wireless coverage information and the user location information by the control device. Compared with the fixed cell group configuration manner in the related art, the configuration manner of embodiments of this disclosure is more flexible.

The embodiments of this disclosure are described above from the perspective of the data transmission method, and the embodiments of this disclosure are described below from the perspective of the data transmission apparatus.

Referring to FIG. 5, an embodiment of this disclosure provides a data transmission apparatus, the data transmission apparatus may be a PCF entity, a BMF entity, a chip located on a PCF entity, or a chip located on a BMF entity, the data transmission apparatus may be used for performing steps performed by the PCF entity or BMF entity in the embodiments shown in FIG. 2 to FIG. 4, and reference may be made to the related description in the foregoing method embodiment.

The data transmission apparatus includes an obtaining unit 501, a first determining unit 502, a second determining unit 503, and a transmission unit 504. One or more of the units of the apparatus can be implemented by processing circuitry, software, or a combination thereof, for example.

The obtaining unit 501 is configured to obtain terminal group information transmitted by an application server, the terminal group information being generated by the application server according to target service data, and the target service data being service data to be transmitted within a target region.

The first determining unit 502 is configured to determine wireless coverage information and user location information.

The second determining unit 503 is configured to determine a group configuration according to the terminal group information, the wireless coverage information, and the user location information.

The transmission unit 504 is configured to transmit the target service data based on the group configuration.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In one embodiment, the second determining unit 503 is specifically configured to: (1) parse the terminal group information, and obtaining N terminal devices within the target region, where N is an integer greater than or equal to 1, and the N terminal devices correspond to the target service data; (2) determine a quantity of radio resources available within the target region according to the wireless coverage information and the user location information; and (3) determine the group configuration based on the N terminal devices, the quantity of radio resources available within the target region, and/or characteristics of the target service data.

In one embodiment, the transmission unit 504 is specifically configured to:

(1) dynamically set a transmission mechanism based on the group configuration, where the transmission mechanism includes one or more of unicast and multicast; and (2) transmit the target service data according to the transmission mechanism.

In one embodiment, the terminal group information includes one or more of a group identifier, an identifier of a terminal device within a group, a communication resource appeal within the group, and quality of service (QoS).

Figures 6, 7:
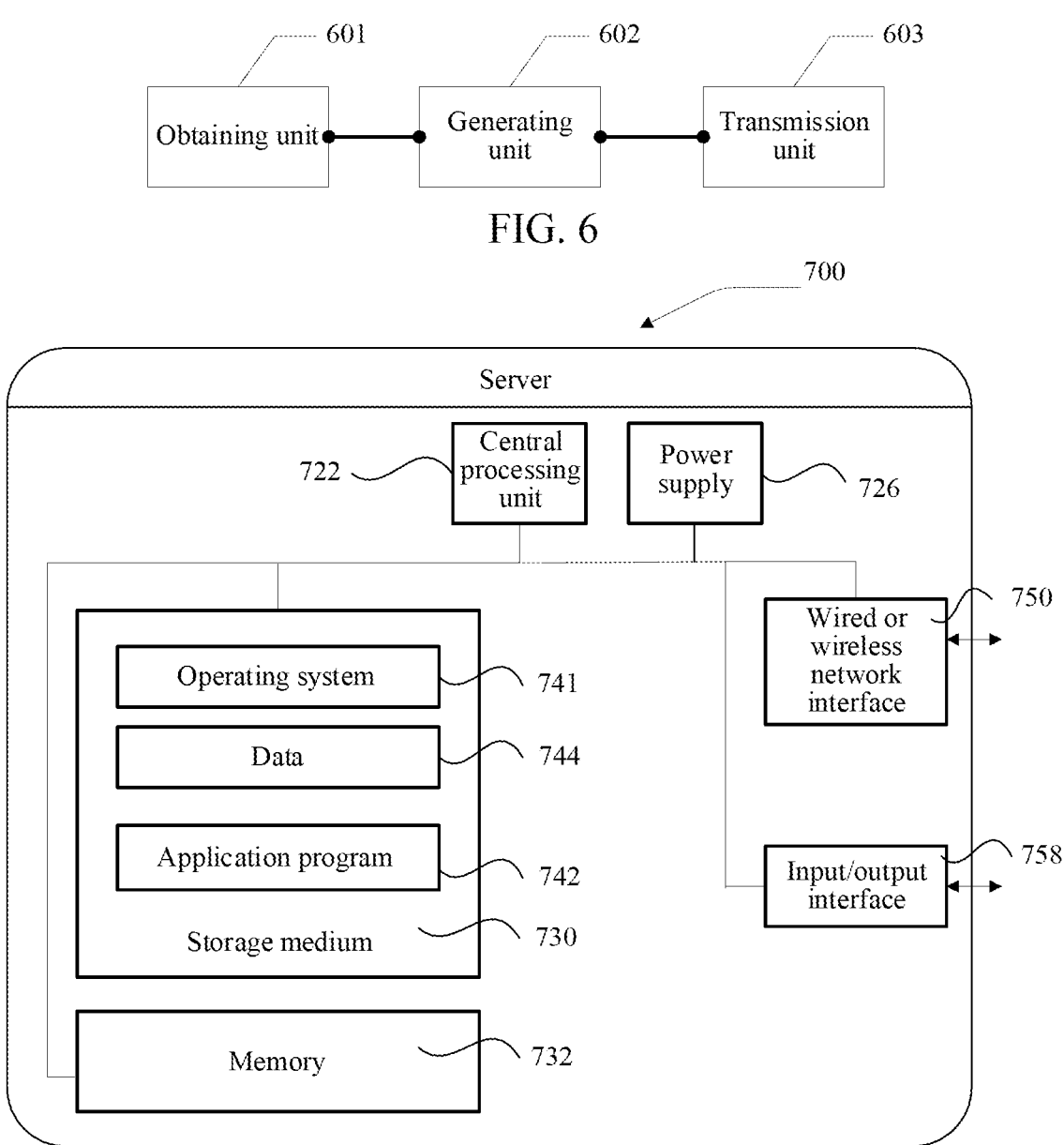
FIG. 6 is another schematic virtual structural diagram of a data transmission apparatus according to an embodiment of this disclosure.
FIG. 7 is a schematic structural diagram of hardware of a server according to an embodiment of this disclosure.

Referring to FIG. 6, an embodiment of this application provides a data transmission apparatus, including an obtaining unit 601, a generating unit 602, and a transmission unit 603. One or more of the units of the apparatus can be implemented by processing circuitry, software, or a combination thereof, for example.

The obtaining unit 601 is configured to obtain target service data, the target service data being service data to be transmitted within a target region.

The generating unit 602 is configured to generate terminal group information according to the target service data.

The transmission unit 603 is configured to transmit the terminal group information to a control device, to cause the control device to determine a group configuration according to the terminal group information, wireless coverage information, and user location information and transmit the target service data based on the group configuration, the wireless coverage information and the user location information being determined by the control device.

In one embodiment, the generating unit 602 is specifically configured to at least one of: (1) determine, by the application server, a service request corresponding to a terminal device within the target region, and generate the terminal group information according to the service request and the target service data; (2) determine, by the application server, subscription information corresponding to a terminal device within the target region, and generate the terminal group information according to the subscription information and the target service data; and (3) analyze, by the application server, a user profile and a user behavior that correspond to a terminal device within the target region, obtain an analysis result, and generate the terminal group information according to the analysis result and the target service data.

In one embodiment, the terminal group information includes one or more of a group identifier, an identifier of a terminal device within a group, a communication resource appeal within the group, and quality of service (QoS).

FIG. 7 is a schematic structural diagram of a server according to an embodiment of the present disclosure. The server 700 may vary greatly due to different configuration or performance, and may include one or more central processing units (CPUs) 722 (for example, one or more processors, i.e., processing circuitry), a memory 732, and one or more non-transitory storage media 730 (for example, one or more mass storage devices) for storing an application program 742 or data 744. The memory 732 and the storage medium 730 may implement transient storage or permanent storage. The program stored in the storage medium 730 may include one or more modules (not shown in the figure), and each module may include a series of instruction operations on the server. Further, the CPU 722 may be configured to communicate with the storage medium 730, and execute, on the server 700, the series of instruction operations stored in the storage medium 730.

The server 700 may further include one or more power supplies 726, one or more wired or wireless network interfaces 750, one or more input/output interfaces 758, and/or one or more operating systems 741 such as Windows Server™, Mac OS X™, Unix™, Linux™, and FreeBSD™.

The steps performed by the control device in the foregoing embodiments may be based on the server structure shown in FIG. 7.

Figure 8:
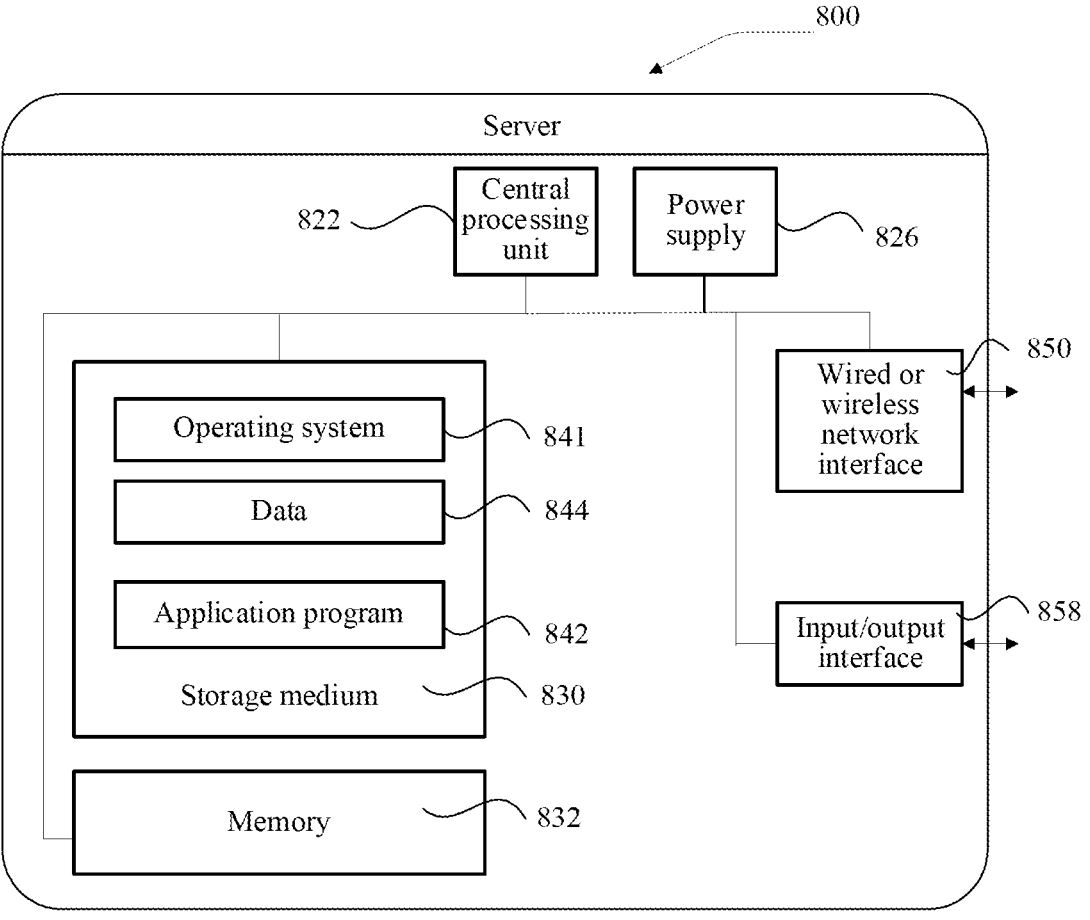
FIG. 8 is another schematic structural diagram of hardware of a server according to an embodiment of this disclosure.

FIG. 8 is a schematic structural diagram of hardware of a server according to an embodiment of the present disclosure. The server 800 may vary greatly due to different configurations or performance, and may include one or more central processing units (CPUs) 822 (for example, one or more processors, i.e., processing circuitry), a memory 832, and one or more non-transitory storage media 830 (for example, one or more mass storage devices) for storing an application program 842 or data 844. The memory 832 and the storage medium 830 may implement transient storage or permanent storage. The program stored in the storage medium 830 may include one or more modules (not shown in the figure), and each module may include a series of instruction operations on the server. Furthermore, the CPU 822 may be configured to be in communication with the storage media 830 and to execute the series of instructions in the storage media 830 on the server 800.

The server 800 may further include one or more power supplies 826, one or more wired or wireless network interfaces 850, one or more input/output interfaces 858, and/or one or more operating systems 841 such as Windows Server™, Mac OS X™, Unix™, Linux™, and FreeBSD™.

The steps performed by the application server in the foregoing embodiments may be based on the server structure shown in FIG. 8.

An embodiment of this disclosure further provides a non-transitory computer-readable storage medium, where the non-transitory computer-readable storage medium stores a computer program, and when the computer program is executed by a computer, the method process related to the data transmission apparatus in any one of the foregoing method embodiments is implemented. Correspondingly, the computer may be the foregoing data transmission apparatus.

An embodiment of this disclosure further provides a computer program or a computer program product including a computer program, where when the computer program is executed on a computer, the computer is caused to implement the method process related to the data transmission apparatus in any one of the foregoing method embodiments is implemented. Correspondingly, the computer may be the foregoing data transmission apparatus.

All or some of the foregoing embodiments in FIG. 2 to FIG. 4 may be implemented by using software, hardware, firmware, or any combination thereof. When software is used to implement the embodiments, the embodiments may be implemented completely or partially in a form of a computer program product.

The computer program product includes one or more computer instructions. When the computer program instruction is loaded and executed on a computer (processing circuitry), all or some of the procedures or functions according to the embodiments of this disclosure are generated. The computer may be a general-purpose computer, a dedicated computer, a computer network, or other programmable apparatuses. The non-transitory computer instruction may be stored in a non-transitory computer-readable storage medium or may be transmitted from a computer-readable storage medium to another computer-readable storage medium. For example, the computer instruction may be transmitted from a website, computer, server, or data center to another web site, computer, server, or data center in a wired (such as a coaxial cable, an optical fiber, or a digital subscriber line (DSL)) or wireless (such as infrared, radio, or microwave or the like) manner. The computer-readable storage medium may be any usable medium accessible by the computer, or a data storage device, such as a server or a data center, including one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

It is to be understood that the processor mentioned in this disclosure may be a central processing unit (CPU) or may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like, all of which are examples of processing circuitry. The general-purpose processor may be a microprocessor, or any other processor.

It is to be further understood that, a quantity of processors in this disclosure may be one or more, may be specifically adjusted according to an actual application scenario, is only exemplarily described herein, and is not limited. A quantity of memories in this embodiment of this disclosure may be one or more, may be specifically adjusted according to an actual application scenario, is only exemplarily described herein, and is not limited.

When the data transmission apparatus includes a processor (or processing circuitry) and a memory, the processor in this disclosure may be integrated together with the memory, or the processor may be connected to the memory through an interface, which may be specifically adjusted according to an actual application scenario, and is not limited A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in this disclosure, it is to be understood that the disclosed system, apparatus, and method may be implemented in other ways. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, the technical solutions of this disclosure essentially, or the part contributing to the related technology, or all or some of the technical solutions may be implemented in the form of a software product. The computer software product is stored in a storage medium and includes several instructions for instructing a computer device (which may be a personal computer, a server, another device, or the like) to perform all or some of the steps of the methods described in the embodiments in FIG. 2 to FIG. 4 of this application.

It is to be understood that, the storage medium or memory mentioned in this application may include a volatile memory or a non-volatile memory, or may include both a volatile memory and a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM).

The memory described herein aims to include but not limited to these memories and any other suitable types of memories.

The foregoing embodiments are merely intended for describing the technical solutions of this disclosure, but not for limiting this disclosure. Although this disclosure is described in detail with reference to the foregoing embodiments, persons of ordinary skill in the art are to understand that they may still make modifications to the technical solutions described in the foregoing embodiments or make equivalent replacements to some technical features thereof, without departing from the scope of the technical solutions of the embodiments of this disclosure.

The invention claimed is:

1. A data transmission method, comprising:
obtaining, by processing circuitry of a network function entity, terminal group information transmitted by an application server of an application function entity, the terminal group information being generated by the application server according to target service data, and the target service data being service data to be transmitted within a target region;
determining, by the processing circuitry, wireless coverage information and user location information;
determining, by the processing circuitry, a quantity of radio resources available within the target region according to the determined wireless coverage information and the determined user location information, wherein the radio resources include frequency spectrum resources and are used to transmit the target service data within the target region;
determining, by the processing circuitry, a group configuration according to the quantity of the radio resources reaching a preset value and the obtained terminal group information generated by the application server, the determined wireless coverage information, and the determined user location information; and
transmitting, by the processing circuitry, the target service data based on the determined group configuration.

2. The method according to claim 1, wherein the determining the group configuration further comprises:
parsing, by the processing circuitry, the terminal group information, and obtaining N terminal devices within the target region, wherein N is an integer greater than or equal to 1, and the N terminal devices correspond to the target service data; and
determining, by the processing circuitry, the group configuration based on at least one of the N terminal devices, the determined quantity of the radio resources available within the target region, and characteristics of the target service data.

3. The method according to claim 1, wherein the transmitting, by the processing circuitry, the target service data based on the group configuration comprises:
dynamically setting, by the processing circuitry, a transmission mechanism based on the determined group configuration, wherein the transmission mechanism comprises one or more of unicast and multicast; and
transmitting, by the processing circuitry, the target service data according to the set transmission mechanism.

4. The method according to claim 1, wherein the obtained terminal group information comprises at least one of a group identifier, an identifier of a terminal device within a group, a communication resource appeal within the group, and a quality of service (QoS).

5. A data transmission method, comprising:
obtaining, by processing circuitry of an application function entity, target service data, the target service data being service data to be transmitted within a target region;
generating, by the processing circuitry, terminal group information according to the obtained target service data; and
transmitting, by the processing circuitry, the generated terminal group information to a network function entity, to cause the network function entity to (i) determine a group configuration according to the generated terminal group information, wireless coverage information, user location information, and a quantity of radio resources reaching a preset value available within the target region according to the wireless coverage information and the user location information, and (ii) transmit the target service data based on the group configuration, the wireless coverage information, and the user location information being determined by the network function entity, wherein the radio resources include frequency spectrum resources and are used to transmit the target service data within the target region.

6. The method according to claim 5, wherein the generating, by the processing circuitry, the terminal group information further comprises at least one of:

determining, by the processing circuitry, a service request corresponding to a terminal device within the target region, and generating the terminal group information according to the service request and the target service data;

determining, by the processing circuitry, subscription information corresponding to the terminal device within the target region, and generating the terminal group information according to the subscription information and the target service data; and analyzing, by the processing circuitry, a user profile and a user behavior that correspond to the terminal device within the target region, obtaining an analysis result, and generating the terminal group information according to the analysis result and the target service data.

7. The method according to claim 5, wherein the terminal group information comprises at least one of a group identifier, an identifier of a terminal device within a group, a communication resource appeal within the group, and a quality of service (QoS).

8. A network function entity, comprising:

first circuitry configured to obtain terminal group information transmitted by an application server of an application function entity, the terminal group information being generated by the application server according to target service data, and the target service data being service data to be transmitted within a target region;

determine wireless coverage information and user location information;

determine a quantity of radio resources available within the target region according to the determined wireless coverage information and the determined user location information, wherein the radio resources includes frequency spectrum resources and are used to transmit the target service data within the target region;

determine a group configuration according to the obtained terminal group information, the determined wireless coverage information, the quantity of resources reaching a preset value, and the determined user location information; and transmit the target service data based on the determined group configuration.

9. The network function entity of claim 8, wherein, in determining the group configuration, the first circuitry is further configured to:

parse the terminal group information, and obtain N terminal devices within the target region, wherein N is an integer greater than or equal to 1, and the N terminal devices correspond to the target service data; and determine the group configuration based on at least one of the N terminal devices, the determined quantity of the radio resources available within the target region, and characteristics of the target service data.

10. The network function entity of claim 8, wherein, in transmitting the target service data based on the group configuration, the first circuitry is further configured to:

dynamically set a transmission mechanism based on the determined group configuration, wherein the transmission mechanism comprises one or more of unicast and multicast; and transmit the target service data according to the set transmission mechanism.

11. The network function entity of claim 8, wherein the terminal group information comprises at least one of a group identifier, an identifier of a terminal device within a group, a communication resource appeal within the group, and a quality of service (QoS).

12. A data transmission system, comprising:

the network function entity of claim 8; and the application server, which comprises second circuitry configured to obtain the target service data;

generate the terminal group information according to the target service data; and transmit the generated terminal group information to the network function entity.

13. A non-transitory computer storage medium, comprising instructions, the instructions, when executed by a computer, cause the computer to perform the data transmission method according to claim 1.

14. The network function entity, comprising processing circuitry and a memory, the memory being configured to store program code and transmit the program code to the processing circuitry; and the processing circuitry being configured to perform the data transmission method according to claim 1 according to instructions in the program code.

15. The application function entity, comprising processing circuitry and a memory, the memory being configured to store program code and transmit the program code to the processing circuitry; and the processing circuitry being configured to perform the data transmission method according to claim 5 according to instructions in the program code.

16. A non-transitory computer-readable storage medium storing instructions, the instructions, when executed by a computer, cause the computer to perform the data transmission method according to claim 5.

17. The data transmission system of claim 12, wherein, in generating the terminal group information, the second circuitry is further configured to at least one of:

determine a service request corresponding to a terminal device within the target region, and generate the terminal group information according to the service request and the target service data;

determine subscription information corresponding to the terminal device within the target region, and generate the terminal group information according to the subscription information and the target service data; and analyze a user profile and a user behavior that correspond to the terminal device within the target region, obtain analysis result, and generate the terminal group information according to the analysis result and the target service data.

18. The data transmission system of claim 12, wherein the terminal group information obtained by the first circuitry comprises at least one of a group identifier, an identifier of a terminal device within a group, a communication resource appeal within the group, and a quality of service (QoS).

19. The network function entity, comprising processing circuitry and a memory, the memory being configured to store program code and transmit the program code to the processing circuitry; and the processing circuitry being configured to perform the data transmission method according to claim 2 according to instructions in the program code.

20. The application function entity, comprising processing circuitry and a memory, the memory being configured to store program code and transmit the program code to the processing circuitry; and the processing circuitry being configured to perform the data transmission method according to claim 6 according to instructions in the program code.

\* \* \* \* \*